June 18, 1946. N. E. LINDENBLAD 2,402,422
COMMUTATOR APPARATUS
Filed March 2, 1943 2 Sheets-Sheet 1

INVENTOR
NILS E. LINDENBLAD.
BY
ATTORNEY

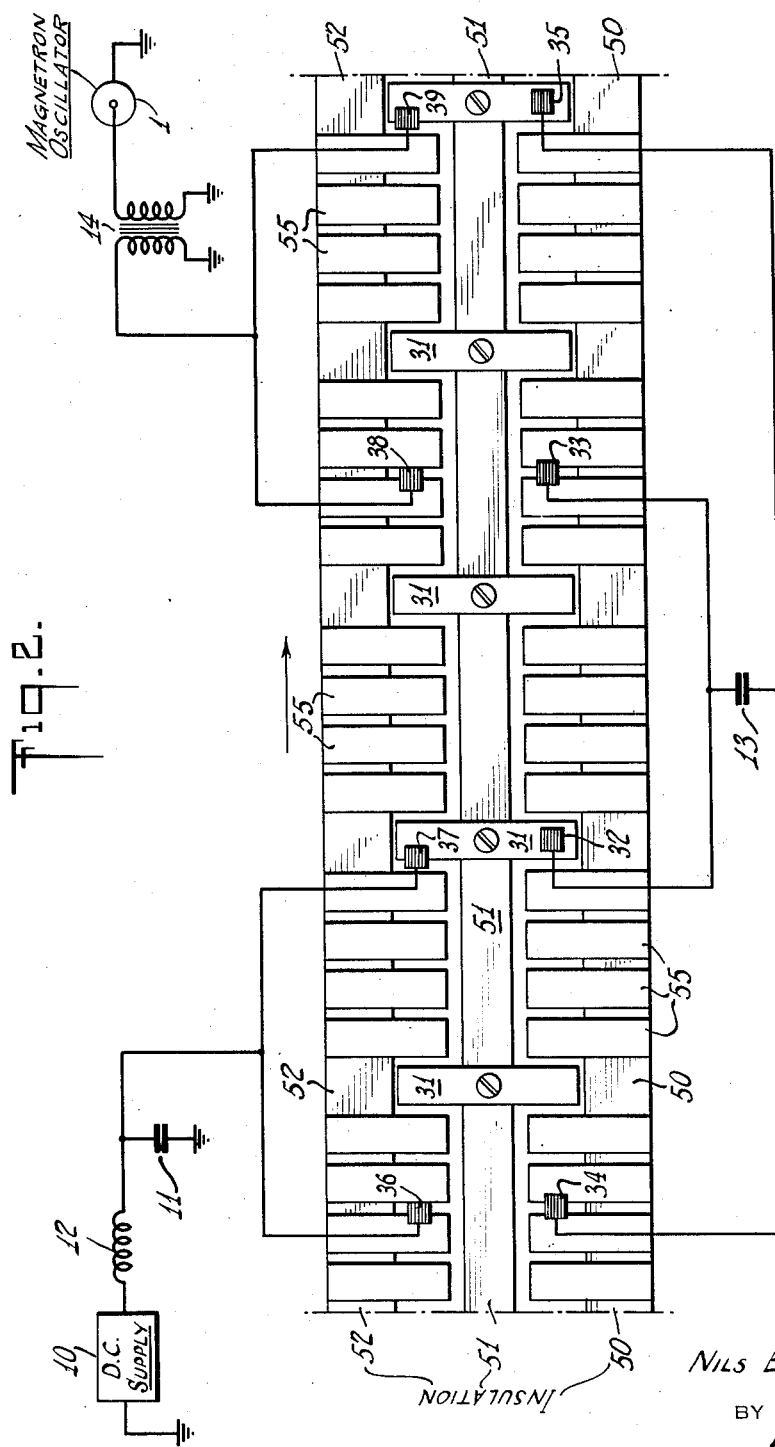

Patented June 18, 1946

2,402,422

UNITED STATES PATENT OFFICE 2,402,422

COMMUTATOR APPARATUS

Nils E. Lindenblad, Port Jefferson, N. Y., assignor to Radio Corporation of America, a corporation of Delaware Application March 2, 1943, Serial No. 477,779

7 Claims. (Cl. 200—28)

This invention relates to pulse generators, and more particularly to improvements in commutators for aiding in converting direct current power to power in the form of unidirectional pulses of extremely short duration, such as might be suitable for use with pulse echo systems of the radio locating type.

In accordance with the preferred system employing the principles of the invention, the apparatus for converting the direct current power to unidirectional pulses comprises a source of direct current supply, a storage condenser coupled to the source, a load, a condenser of small capacity compared to said storage condenser adapted to be charged from the storage condenser and discharged through the load, and an improved form of commutator arrangement interposed between the storage condenser and small capacity condenser for enabling the charging and discharging of the small capacity condenser in such manner that pulses of extremely short duration are passed always in the same direction through the load.

A salient feature of the present invention lies in the commutator arrangement which, briefly stated, comprises a plurality of spaced contact making bars having interposed between them a plurality of idler or rider bars. These rider bars are made of metal to provide a metallic surface over which the brushes ride as the commutator rotates, in order to reach the contact bars. The contact making bars and the metallic idler or riding bars are supported from separate insulating mountings in the form of discs. These discs are, of course, driven from a common shaft, in turn linked to a suitable motor. The construction of this commutator arrangement is such that short path creepage and undesired arc-over between contact bars and rider bars is overcome and both types of bars wear evenly with use.

A better understanding of the invention may be had by referring to the accompanying drawings, wherein:

Fig. 3 and Fig. 4 show side views of the different embodiments of the commutator of the invention.

Figure 1:
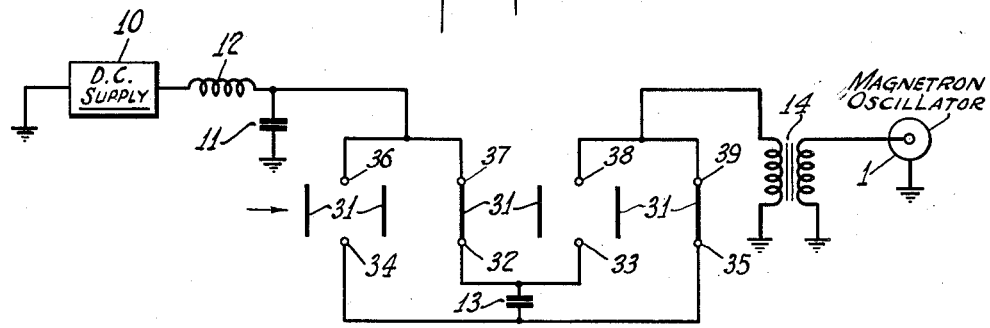
Fig. 1 shows generally one form of pulse generating system in which the present invention may be employed, given merely for the purpose of exposition.

Referring to Fig. 1 in more detail, there is shown (schematically) an apparatus for converting direct current power to pulses of extremely short duration for use with a radio locating system. Such a system requires that the short duration pulses be separated by intervals of time considerably greater than the duration of each pulse. Each pulse may have a duration of, let us say, one microsecond or less. The transmitting apparatus is diagrammatically illustrated in the form of a magnetron oscillator 1, which it is desired to excite momentarily and periodically for extremely short periods of time in order to enable the radiation of pulses of high power compared to the available output during the steady state continuous operation condition of the oscillator. One way of exciting oscillator 1 shown in the drawings is to supply high voltage pulses to the cathode electrode while grounding the anode electrode. The oscillator is merely shown diagrammatically, since the details thereof form no part of the present invention per se. The power transmitter for supplying this high power pulse to the oscillator comprises a source of direct current power 10 which is coupled to a storage condenser 11 through a choke coil 12. This direct current source 10 can be a rectifier, a direct current generator or a large battery, let us say having a voltage of 1000 or 2000 volts. A condenser 13 of relatively small capacity compared to the capacity of the storage condenser 11 is adapted, by means of the commutator arrangement to be hereinafter described, to be charged and subsequently discharged periodically through the load in the same direction. The load in this case is the step-up transformer 14, whose primary winding is connected to certain brushes of the commutator, and whose secondary winding is connected to the cathode of the magnetron oscillator.

A rotating commutator having a plurality of equally spaced commutating segments 31 serves to periodically reverse the connections of the condenser 13 to the storage condenser 11 and the load. The condenser 13 has its upper terminal connected to a plurality of brushes or contacts 32 and 33, while the lower terminal of condenser 13 is connected to a plurality of brushes 34 and 35. The relatively low voltage source 10 is connected to a plurality of contacts 36 and 37, while the upper terminal of the primary winding of step-up transformer 14 is connected to a plurality of contacts 38 and 39. In one position of the commutator, one segment 31 will bridge brushes 39 and 35, while at the same time another segment 31 will bridge contacts 37 and 32, thus producing a complete circuit from the direct current charging source through the condenser 13 and the primary winding of transformer 14. In this position, there is no direct connection between contacts 36 and 34 or between contacts 38 and 33. In another position of the commutator, a segment 31 will bridge contacts 36 and 34, while simultaneously another segment 31 will bridge brushes 38 and 33. At this particular time, there will be no direct current connection between brushes 37 and 32 or between 39 and 35, by virtue of the fact that the segments which previously bridged them have now passed beyond these brushes in their path of travel. In this last position, the circuit will again be complete from the direct current charging source through the condenser 13 and through the primary winding of the transformer 14, but it should be noted that the connections of the condenser 13 have now been reversed relative to the first position. As the commutator revolves in the direction of the arrow, this cycle of operations will be repeated, thus producing repeated voltage pulses through the primary winding of the transformer 14 in the same direction but of double the value of the direct current charging source.

The system of Fig. 1 is described in more detail in my copending application Serial No. 473,677, filed January 27, 1943, to which reference is made for a complete and amplified exposition of the manner of converting direct current power to periodically recurring high voltage pulses.

Figure 2:
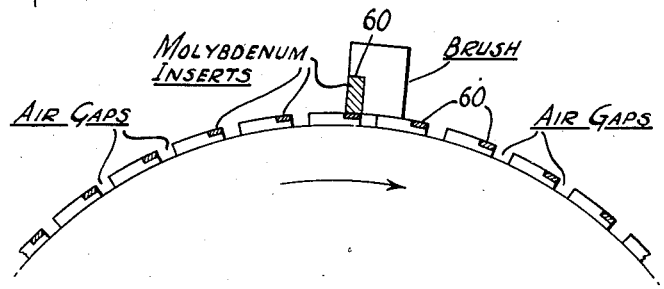
Fig. 2 shows the construction of applicant's commutator.

The present invention is primarily concerned with the commutator system which is shown in more detail in Fig. 2. In order to more easily understand how the commutator of Fig. 2 fits into the system of Fig. 1, there have been shown in Fig. 2 the associated circuit elements for the commutator which are labeled with the same reference numerals as the equivalent elements of Fig. 1. The commutator of Fig. 2 is shown laid out in a straight line for the sake of simplicity, although it will be understood that the commutator, in practice, is a circular drum-like affair adapted to rotate at the speed of a centrally located drive shaft, in turn linked to a motor.

The commutator of the invention comprises three insulating supports 50, 51 and 52, each of which is in the form of a disc. The outer supports 50 and 52 carry on their peripheries relatively short metallic idler or rider bars 55 which are separated from one another by air gaps. The centrally located insulating support 51 carries on its periphery, contact making bars 31, 31 whose lengths are longer than the rider bars and which are located between certain rider bars in the manner shown in the drawings. The outer surface of the contact bars 31, 31 and the rider bars 55, 55 lie on a circle for providing a very smooth path of travel for the commutator under the stationary brushes 32 to 39, inclusive. It should be noted that between each pair of contact bars 31, 31 there are provided four metallic rider bars on each side of the central insulating support 51. Each idler or rider bar on one side of the central support 51 has another rider bar on the other side of support 51 arranged in the same straight line. The purpose of the rider bars 55, 55 is merely to provide metallic surfaces over which the brushes 32 to 39, inclusive, ride, as the commutator rotates. These rider bars are made of metal instead of insulation in order to provide even wear of both rider and contact bars and to prevent brush chatter. If the rider bars were made of insulation, on the other hand, they would wear away faster than the contact bars, in which case the contact would wear away unevenly and cause brush chatter, which is an undesirable condition.

The reason that the rider bars 55, 55 between the contact bars 31, 31 are sub-divided is to assure maximum protection against premature flash or arc-over. Further assurance of this maximum protection is obtained by mounting the rider and contact bars on different insulating supports, as shown, such that there are air gaps between adjacent rider bars and between rider bars and contact bars. In this way, there is prevented the possibility of dirt or dust accumulating between the rider and contact bars and thus causing undesired flash or arc-over between adjacent bars. The commutator assemblage of the invention thus enables the use of higher voltages than heretofore possible by conventional commutators.

Fig. 3 illustrates a fragmentary side view of one preferred form of commutator arrangement of the type shown in more detail in Fig. 2. In Fig. 3, only one stationary brush is shown and only one side of the commutator arrangement shown, although it should be understood that the same features illustrated and hereinafter described apply equally well to the other brushes of the other contacts and rider bars (not shown). The rider and contact bars are here shown provided with molybdenum inserts 60 on their leading edges and the brush is also shown provided with such an insert on its leading edge. The rest of the brush can be made of bronze or cast iron material. I have found that the commutator possesses better mechanical and electrical wearing properties when molybdenum inserts are employed, in the manner illustrated in the drawings, because of the fact that molybdenum is very hard, has a high melting point, and does not deteriorate under arcing. It is also preferred that the molybdenum should not extend over the entire brush surface because such an arrangement would cause excessive wear between the brush and the bars over which it rotates.

Figure 4:
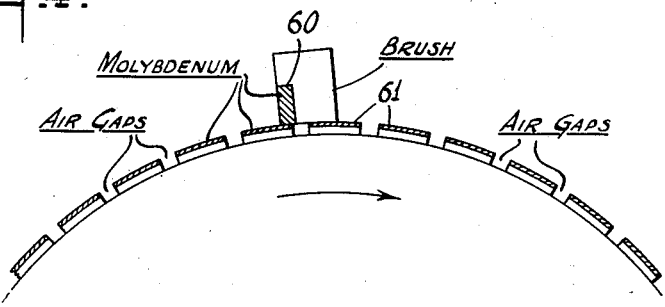

Fig. 4 shows a modification which is somewhat different from Fig. 3 and which could also be used in the practice of the invention. In Fig. 4, both the rider and contact bars are provided with molybdenum surfaces 61, while only the brush is provided with a molybdenum insert 60 on its leading edge. The rest of the brush may be cast iron or bronze, as described above in connection with Fig. 3.

If desired, in assembling the commutator and brush elements of the invention, the brushes of each pair (such as 34, 36; 32, 37; 33, 38; and 35, 39 of Fig. 2) may be staggered, as shown in Fig. 2, so that one brush of a pair makes contact with a contact making bar 31 before the other brush of the same pair, thus assuring spark free operation on that brush of the pair which first engages the contact making bar. Where the brushes of each pair are staggered, and the surfaces of the rider and metallic bars have a molybdenum coating or dressing, as shown in Fig. 4, then the leading brush of each pair can be made of bronze or cast iron with a central inlay of molybdenum, while the lagging brush of each pair can be made of bronze or cast iron and have only the leading edge of molybdenum.

The improved commutator of the invention has the following advantage, among others. As the operating voltage is increased, the commutator gradually functions more and more in the manner of a rotary spark gap, i. e., the discharge between the brush and the contact bar which approaches it takes place before actual conductive contact is made between the two elements. The only difference between a rotary spark gap as known in the art and a conductive commutator assembly as previously described, is that in the latter case the maximum distance between the stationary brush and the rotating contact bar is zero, while in the former case there is always some finite distance greater than zero between brush and contact bar which must be broken down. In the commutator of the invention, the distance between brush and commutator segment required for spark-over can always be obtained after continued usage of the commutator. That is, even though the edges of the surfaces of the elements of my commutator wear with usage, the new portions of these surfaces will always be utilized because they shift into place as the commutator rotates. In a rotary spark gap arrangement, however, as the sparking wears away the electrode surfaces, the distance between the surfaces increases.

The commutator of the invention has been found to be advantageous particularly in the intermediate voltage regions, say 1000 volts to 3000 volts, which are too low for regular spark gap operation.

In employing the commutators of the invention to obtain microsecond duration pulses through the load transformer, the discharge phenomenon is usually completed before or at the time when the brush makes contact with the contact bar.

What is claimed is:

1. In combination, a commutator comprising three spaced insulating discs, metallic idler or rider bars mounted on the peripheries of the two outer discs, said idler bars being spaced from one another by air gaps, there being the same number of idler bars on both outer discs, each idler bar on one outer disc having a corresponding idler bar on the other outer disc arranged in the same straight line across the commutator but spaced therefrom by at least the width of the central insulating disc, contact bars mounted on said central disc and equally spaced from one another by a distance sufficiently large to accommodate several spaced idler bars, each of said contact bars having a length longer than the width of the central disc and extending between the idler bars on both outer discs, the outer surfaces of said idler and contact bars lying on a circle, and a pair of brushes positioned on opposite sides of the central disc by a distance less than the length of a contact bar and adapted to ride on oppositely disposed rider bars and to be periodically connected together by said contact bars, as the commutator revolves.

2. In combination, a commutator comprising three spaced insulating discs, metallic idler or rider bars mounted on the peripheries of the two outer discs, said idler bars being spaced from one another by air gaps and having lengths which do not extend across the central insulating disc, contact bars mounted on said central disc and equally spaced from one another by a distance sufficiently large to accommodate several spaced idler bars, each of said contact bars having a length longer than the width of the central disc and extending between the idler bars on both outer discs, the outer surfaces of said idler and contact bars lying on a circle, and a pair of brushes positioned on opposite sides of the central disc by a distance less than the length of a contact bar and adapted to ride on oppositely disposed rider bars and to be periodically connected together by said contact bars as the commutator revolves.

3. In combination, a commutator comprising three spaced insulating discs, metallic idler or rider bars mounted on the peripheries of the two outer discs, said idler bars being spaced from one another by air gaps and having lengths which do not extend across the central insulating disc, contact bars mounted on said central disc and equally spaced from one another by a distance sufficiently large to accommodate several spaced idler bars, each of said contact bars having a length longer than the width of the central disc and extending between the idler bars on both outer discs, the outer surfaces of said idler and contact bars lying on a circle, and a pair of brushes positioned on opposite sides of the central disc by a distance less than the length of a contact bar and adapted to ride on oppositely disposed rider bars and to be periodically connected together by said contact bars as the commutator revolves, said brushes being staggered, thereby assuring spark free operation on that brush of said pair which first contacts a contact bar.

4. A combination as defined in claim 2, characterized in this that each of said brushes has a molybdenum insert on its leading edge, the rest of the brush being made of metal which is softer than molybdenum, said idler and contact bars also being provided with molybdenum on at least their leading edges.

5. A combination as defined in claim 2, characterized in this that each of said brushes has a molybdenum insert on its leading edge, the rest of said brush being made of a metal softer than molybdenum, said idler and contact bars having a coating of molybdenum on their surfaces adapted to contact said brushes.

6. In combination, a commutator having three spaced, coextensive, circular insulating supports, said supports being spaced from one another near their outer edges by air gaps, metallic idler or rider bars mounted on the peripheries of the two outer supports, said idler bars being spaced from one another by air gaps and having lengths which do not extend across the central insulating support, contact bars mounted on said central support and equally spaced from one another by a distance sufficiently large to accommodate several spaced idler bars, each of said contact bars having a length longer than the width of the central support and extending between the idler bars on both outer supports, the outer surfaces of said idler and contact bars lying on a circle, and a pair of brushes positioned on opposite sides of the central support by a distance less than the length of a contact bar and adapted to ride on oppositely disposed rider bars and to be periodically connected together by said contact bars as the commutator revolves.

7. In combination, a commutator comprising three spaced insulating discs, metallic idler or rider bars mounted on the peripheries of the two outer discs, said idler bars being spaced from one another by air gaps, contact bars mounted on said central disc and equally spaced from one another by a distance sufficiently large to accommodate several spaced idler bars, each of said contact bars having a length longer than the width of the central disc and extending between the idler bars on both outer discs and spaced therefrom, the outer surfaces of said idler and contact bars lying on a circle, and a pair of brushes positioned on opposite sides of the central disc by a distance less than the length of a contact bar and adapted to ride on oppositely disposed rider bars and to be periodically connected together by said contact bars as the commutator revolves.

NILS E. LINDENBLAD.